(12) United States Patent
Salgian et al.

(10) Patent No.: US 8,340,349 B2
(45) Date of Patent: Dec. 25, 2012

(54) MOVING TARGET DETECTION IN THE PRESENCE OF PARALLAX

(75) Inventors: Garbis Salgian, West Windsor, NJ (US);
Supun Samarasekera, Montgomery, NJ (US); Jiangjian Xiao, Plainsboro, NJ (US); James Russell Bergen, Hopewell, NJ (US); Rakesh Kumar, West Windsor, NJ (US); Feng Han, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 1517 days.

(21) Appl. No.: 11/763,559

(22) Filed: Jun. 15, 2007

(65) Prior Publication Data

US 2008/0089556 A1    Apr. 17, 2008

Related U.S. Application Data

(60) Provisional application No. 60/909,167, filed on Mar. 30, 2007, provisional application No. 60/815,230, filed on Jun. 20, 2006.

(51) Int. Cl.
*G06K 9/00*    (2006.01)

(52) U.S. Cl. ........ 382/103; 382/107; 348/142; 348/143; 348/154; 348/169; 348/208.4

(58) Field of Classification Search .................. 382/103, 382/107; 348/142–144, 148–159, 169, 208.4
See application file for complete search history.

(56) References Cited

U.S. PATENT DOCUMENTS

| 5,259,040 | A  | * | 11/1993 | Hanna .......................... 382/107 |
| 6,269,175 | B1 | * | 7/2001  | Hanna et al. .................. 382/107 |
| 6,353,678 | B1 | * | 3/2002  | Guo et al. .................... 382/154 |
| 6,430,304 | B2 | * | 8/2002  | Hanna et al. .................. 382/107 |
| 6,487,304 | B1 | * | 11/2002 | Szeliski ........................ 382/107 |
| 6,490,364 | B2 | * | 12/2002 | Hanna et al. .................. 382/107 |
| 6,507,661 | B1 | * | 1/2003  | Roy ............................... 382/107 |
| 7,003,134 | B1 | * | 2/2006  | Covell et al. .................. 382/103 |

(Continued)

OTHER PUBLICATIONS

Kang et al. "Detection and tracking of moving objects from a moving platform in presence of strong parallax" Computer Vision, 2005. ICCV 2005. Tenth IEEE International Conference on vol. 1, Oct. 17-21, 2005, pp. 10-17.*

Ishikawa et al., "Occlusions, discontinuities, and epipolar lines in stereo" In European Conference on Computer Vision. Jun. 2-6, 1998. pp. 1-14.*

(Continued)

*Primary Examiner* — Matthew Bella
*Assistant Examiner* — Julian Brooks
(74) *Attorney, Agent, or Firm* — Moser Taboada

(57) ABSTRACT

A method for detecting a moving target is disclosed that receives a plurality of images from at least one camera; receives a measurement of scale from one of a measurement device and a second camera; calculates the pose of the at least one camera over time based on the plurality of images and the measurement of scale; selects a reference image and an inspection image from the plurality of images of the at least one camera; and detects a moving target from the reference image and the inspection image based on the orientation of corresponding portions in the reference image and the inspection image relative to a location of an epipolar direction common to the reference image and the inspection image; and displays any detected moving target on a display. The measurement of scale can derived from a second camera or, for example, a wheel odometer. The method can also detect moving targets by combining the above epipolar method with a method based on changes in depth between the inspection image and the reference image and based on changes in flow between the inspection image and the reference image.

29 Claims, 8 Drawing Sheets

U.S. PATENT DOCUMENTS

| | | | | |
|---|---|---|---|---|
| 7,031,497 B2* | 4/2006 | Trajkovi | ................... | 382/107 |
| 7,512,250 B2* | 3/2009 | Lim et al. | ................... | 382/103 |
| 7,860,273 B2* | 12/2010 | Kochi et al. | ................... | 382/103 |
| 7,929,728 B2* | 4/2011 | Guo et al. | ................... | 382/103 |
| 8,073,196 B2* | 12/2011 | Yuan et al. | ................... | 382/103 |
| 2001/0019621 A1* | 9/2001 | Hanna et al. | ................... | 382/107 |
| 2001/0043738 A1* | 11/2001 | Sawhney et al. | ............. | 382/154 |
| 2004/0109585 A1* | 6/2004 | Tao et al. | ................... | 382/106 |
| 2006/0204035 A1* | 9/2006 | Guo et al. | ................... | 382/103 |

OTHER PUBLICATIONS

Nister D. et al., "Visual Odometry for Ground Vehicle Applications," Journal of Field Robotics, vol. 23(1) (2006).

Zhu Z. et al., "Precise Visual Navigation in Unknown GPS-Denied Environments Using Multi-Stereo Vision and Global Landmark Matching," Unmanned Systems Technology IX, Proceedings of SPIE, vol. 6561 (Apr. 2007).

J.R. Bergen et al., "Hierarchical Model-Based Motion Estimation," European Conference on Computer Vision, pp. 237-252 (1992).

* cited by examiner

MOVING TARGET DETECTION IN THE PRESENCE OF PARALLAX

CROSS-REFERENCE TO RELATED APPLICATIONS

This application claims the benefit of U.S. provisional patent application No. 60/815,230 filed Jun. 20, 2006, and U.S. provisional patent application No. 60/909,167 filed Mar. 30, 2007, the disclosures of which are incorporated herein by reference in their entirety.

GOVERNMENT RIGHTS IN THIS INVENTION

This invention was made with U.S. government support under contract number DAAD19-01-2-0012 and DAAB07-01-9-L504. The U.S. government has certain rights in this invention.

FIELD OF THE INVENTION

The present invention relates generally to vision systems, and more particularly to a method and system that automatically detects moving objects in the presence of parallax which may be induced in a plurality of video cameras mounted on a moving platform.

BACKGROUND OF THE INVENTION

The accurate capture and detection of moving objects with video cameras that are mounted on a moving platform is highly desirable in several types of applications. Such applications include ground or low altitude air vehicles (manned or unmanned) that need to detect moving objects in the operating environment; automatic detection of potential targets/threats that pop-up or move into view for military vehicles and altering an operator of a vehicle to these potential threats; and safe operation of (unmanned) ground vehicles, where there is a need to detect moving and stationary pedestrians/dismounted personnel in order to prevent accidents. Detection of independently moving targets from a moving ground vehicle is challenging due to the strong parallax effects caused by camera motion close to the 3D structure in the environment of the vehicle.

A warfighter crew operating a military vehicle in an urban environment is exposed to numerous threats from all directions. A distributed aperture camera system can provide the vehicle crew with continuous, closed-hatch 360-degree situational awareness of the immediate surroundings. However, it is difficult for an operator of the military vehicle to simultaneously and manually monitor an entire array of cameras and sensors. It would be desirable to have automatic, continuous, closed-hatch hemispherical situational awareness of the immediate surroundings for the vehicle occupants while on the move. This would enhance the crew's ability to drive/navigate while under the protection of armor and provide them with the relative location of the vehicle and target bearing relative to that vehicle using passive sensing. (Passive sensing refers to anything that does not project light or any type of energy in a scene. Reflected light is received in a camera from an object in passive sensing as opposed to active sensing such as radar wherein electromagnetic waves are sent to and reflected from a scene and the return signal is measured. Passive sensing is thus more covert and therefore more desirable).

A technology that can provide automatic detection of moving objects for a video platform that is itself moving is known as Moving Target Indication On The Move (MTI-OTM). Forms of MTI developed in the prior art for use in a moving vehicle have been previously demonstrated using global parametric transformations for stabilizing the background. This technique has failed in situations in which static 3D structure in the scene displays significant parallax. For a ground vehicle, the parallax induced by the 3D structure on the ground cannot be ignored. The MTI approach should be able to distinguish between image motion due to parallax and motion due to independently moving objects. Other approaches for MTI detections from a moving platform use stereo to recover the 3D structure of the scene and find image regions where the frame-to-frame motion is inconsistent with the scene structure. The detection range for these approaches is limited by the distance at which reliable rang estimates can be obtained from stereo optics (determined by camera focal length and resolution and stereo baseline). Furthermore, for actual systems that need to provide 360 degree coverage, a solution using monocular cameras is attractive since the number of cameras required is half that for a panoramic stereo system. A practical algorithm needs to be able to handle the full range of natural environments, from planar scenes to ones with sparse 3D parallax and up to scenes with dense 3D parallax (Sparse 3D parallax refers to scenes where there are just a few things that protrude from a ground plane. Dense 3D parallax refers to environments such as a forest or a narrow street where the structure is very rich).

Accordingly, what would be desirable, but has not yet been provided, is a system and method for effectively and automatically detecting and reporting moving objects in situations where the video capturing platform is itself moving, thereby inducing parallax in the resulting video.

SUMMARY OF THE INVENTION

The above-described problems are addressed and a technical solution is achieved in the art by providing a method for detecting a moving target comprising the steps of receiving a plurality of images from at least one camera; receiving a measurement of scale from one of a measurement device and a second camera; calculating the pose of the at least one camera over time based on the plurality of images and the measurement of scale; selecting a reference image and an inspection image from the plurality of images of the at least one camera; detecting a moving target from the reference image and the inspection image based on the orientation of corresponding portions in the reference image and the inspection image relative to a location of an epipolar direction common to the reference image and the inspection image; and displaying any detected moving target on a display. The measurement of scale can derived from a second camera or, for example, a wheel odometer. The method of the present invention can also detect moving targets by combining the above epipolar method with a method based on changes in depth between the inspection image and the reference image and based on changes in flow between the inspection image and the reference image. The list of candidate moving targets can be narrowed by applying an appearance classifier to a portion of the reference image containing a candidate moving target. Pose is determined by visual odometry. The method also receive measurements from an IMU. And an optional GPS receiver.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
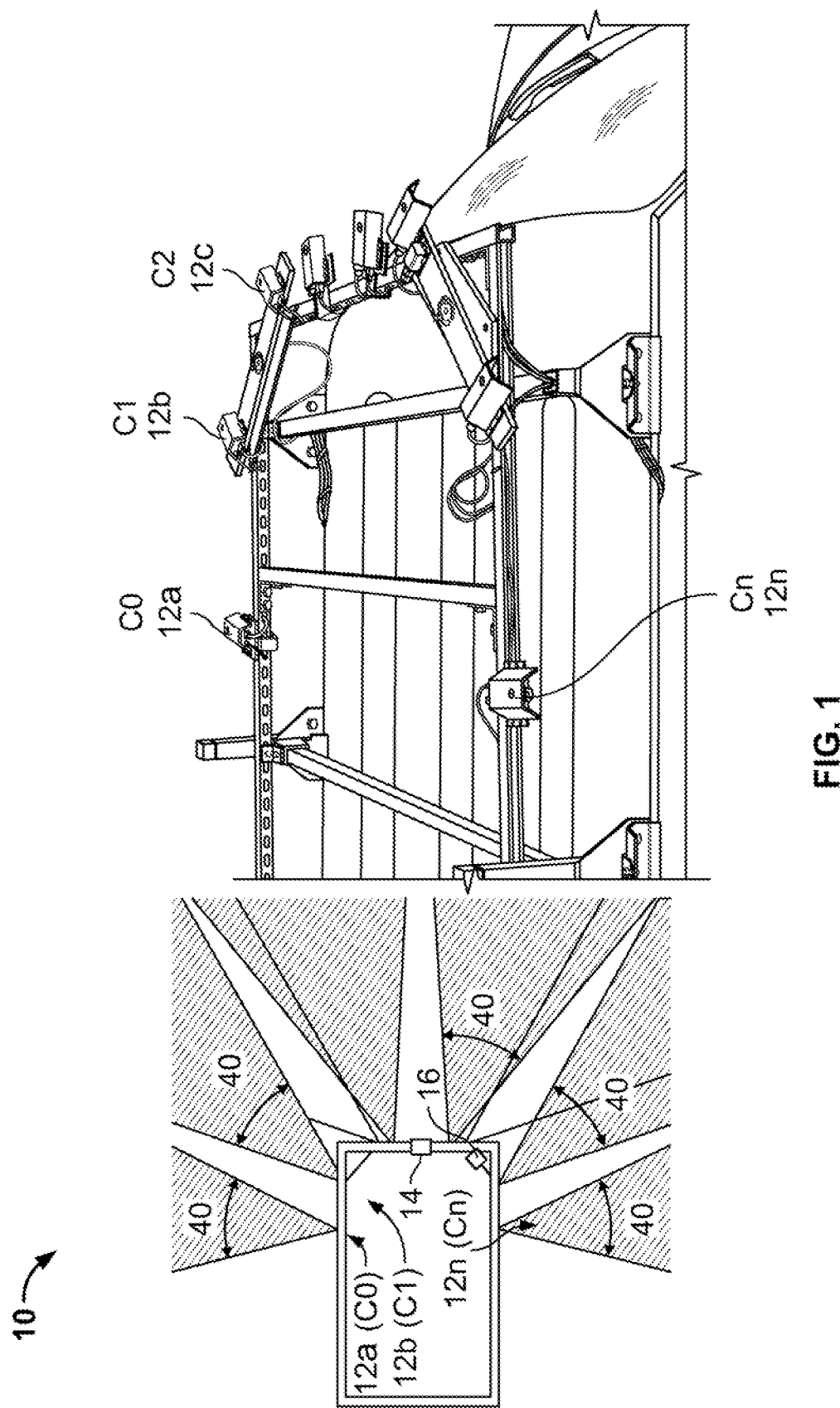
FIG. 1 is a top plan illustration and a perspective view of a moving target indication system, constructed in accordance with an embodiment of the present invention.
Figure 2:
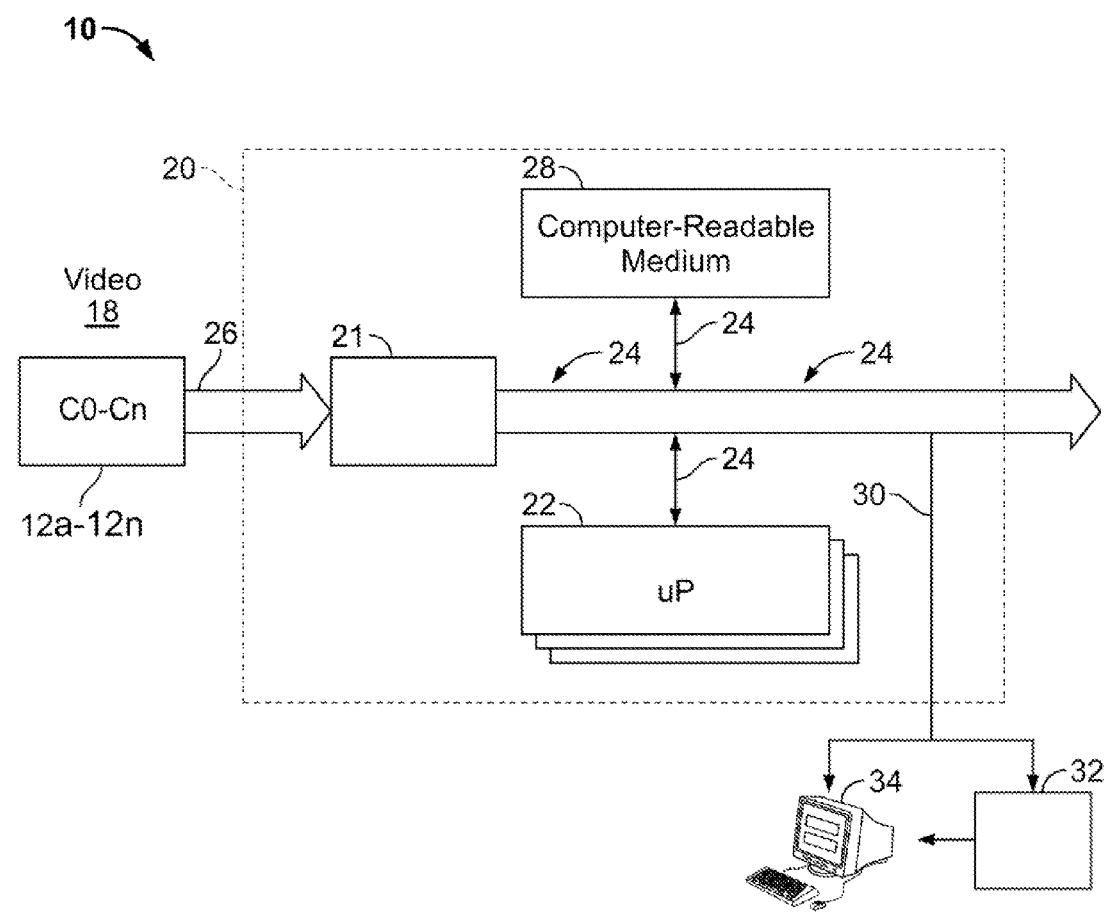
FIG. 2 is a block diagram of a hardware architecture, corresponding to the system of FIG. 1.
Figure 3:
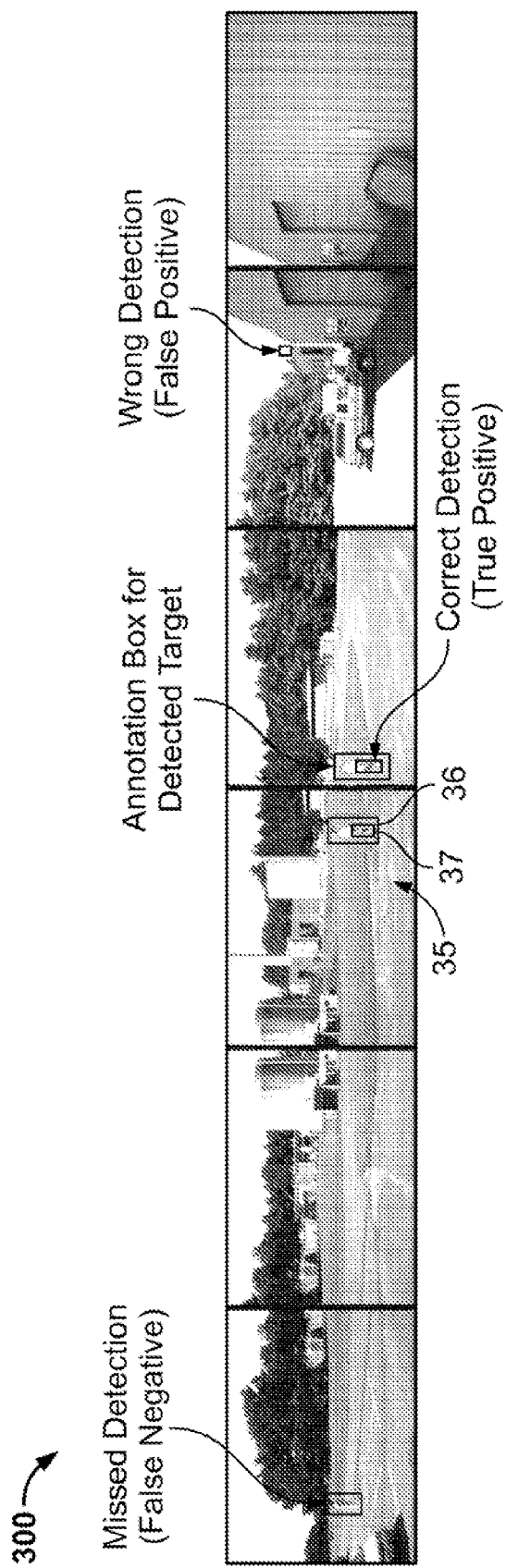
FIG. 3 are a set of video images showing an output of the system in which a detected moving target is designated by surrounding bounding boxes.

Referring now to FIGS. 1-3, a moving target indication system is depicted, generally indicated at 10. By way of a non-limiting example, the system 10 receives digitized video from a plurality of cameras 12a-12n (labeled C0-CN), which may be rigidly mounted on a frame 14 (see FIG. 1) relative to each other and designed to cover overlapping or non-overlapping fields of view. In the example shown, the cameras 12a-12n (e.g., an AVT Marlin, 640×480) have fields of view of about 40 degrees each, for a total of about 200 degrees total field of view. All of the cameras, 12a-12n, have been calibrated to determine their intrinsic parameters and also the rigid transformation between any two cameras (the extrinsic calibration information stored in block 44 of FIG. 4 to be discussed hereinbelow). To capture positions in real world coordinates, the system 10 may be equipped with a global positioning system receiver (GPS) 14. The system 10 may also be equipped with an inertial measurement unit (IMU) 16 (e.g., a CloudCap Crista) to capture the orientation of the measurement platform. Data from all the sensors 12a-12n, 14, 16 can be time-stamped and logged in real time at different rates (e.g., 30 Hz for the cameras 12a-12n, 100 Hz for then IMU 16, and 1 Hz for the GPS 14). The cameras 12a-12n and the IMU 16 can be synchronized with an external hardware trigger (not shown).

The system 10 can also include a digital video capture system 18 and a computing platform 20 (see FIG. 2). The digital video capturing system 18 processes streams of digital video, or converts analog video to digital video, to a form which can be processed by the computing platform 20. The digital video capturing system may be stand-alone hardware, or cards 21 such as Firewire cards which can plug-in directly to the computing platform 20. The computing platform 20 may include a personal computer or work-station (e.g., a Pentium-M 1.8 GHz PC-104 or higher) comprising one or more processors 22 which includes a bus system 24 which is fed by video data streams 26 via the processor or directly to a computer-readable medium 28. The computer readable medium 28 can also be used for storing the instructions of the system 10 to be executed by the one or more processors 22, including an operating system, such as the Windows or the Linux operating system. The computer readable medium 28 can include a combination of volatile memory, such as RAM memory, and non-volatile memory, such as flash memory, optical disk(s), and/or hard disk(s). A processed video data stream 30 can be stored temporarily in the computer readable medium 28 for later output or fed in real time locally or remotely via an optional transmitter 32 to a monitor 34. The monitor 34 can display processed video data stream 30 showing a scene 35 with overlaid bounding boxes 36 (see FIG. 3) enclosing moving targets 37 or other markers of the moving targets 37 and can be accompanied by text and/or numerical coordinates, such as GPS coordinates.

Figure 4:
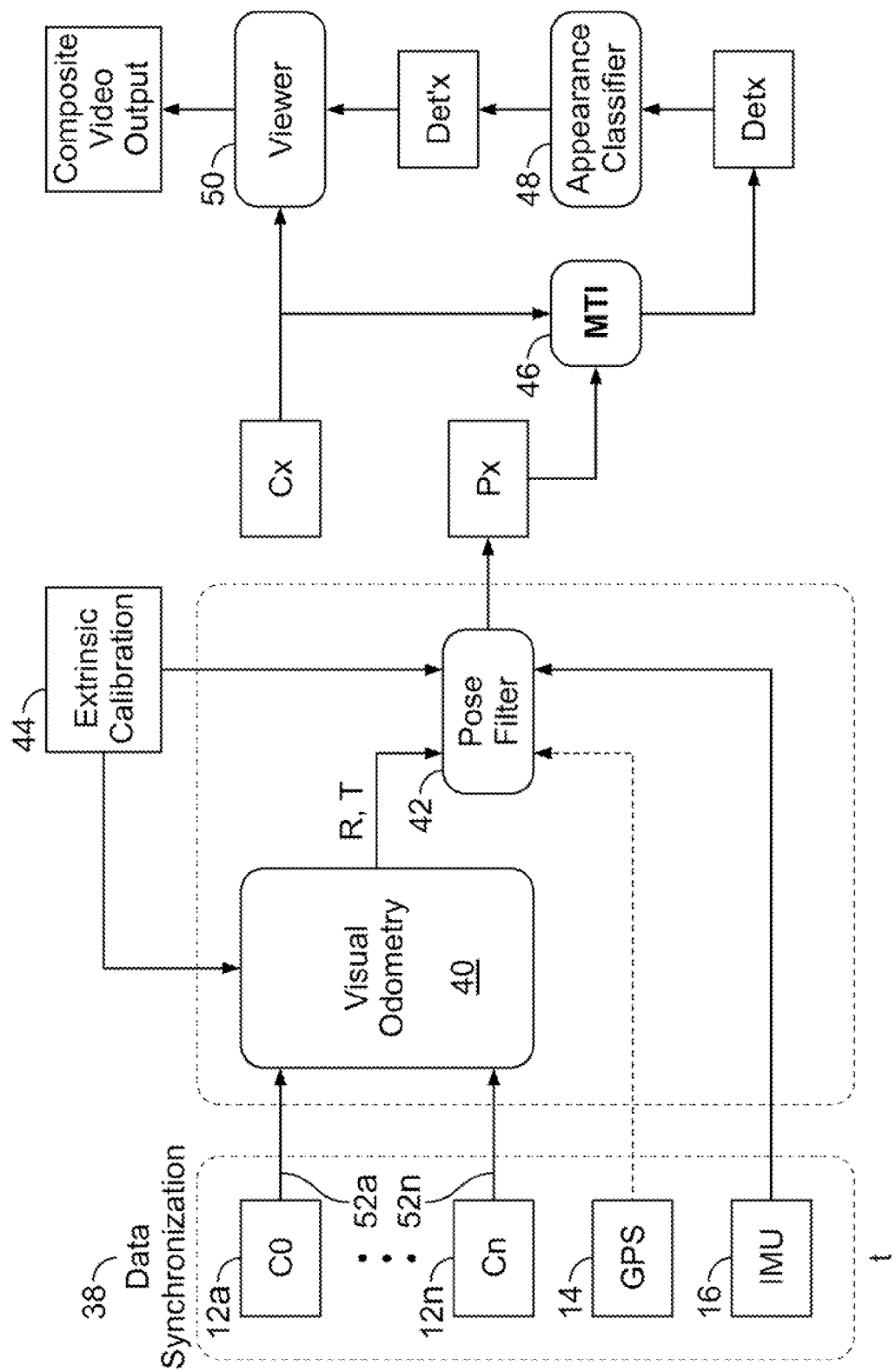
FIG. 4 is block diagram of software architecture associated with the system of FIG. 1.

Referring now to FIGS. 1 and 4, a block diagram of the software architecture of the present invention is depicted. The software architecture includes the data streams from the cameras 12a-12n (C0-CN), GPS 14, and IMU 16, a data synchronization module 38, a visual odometry module 40, a pose filter 42, extrinsic calibration data (block) 44, a moving target indication (MTI) module 46, an appearance classifier module 48, and a viewer 50. The first processing step is to synchronize the data streams from the sensors 12a-12n, 14, and 16 using the data synchronization module 38. The data synchronization module 38 uses the time stamp that was saved with each record of each data stream during data collection to align the data streams corresponding to the sensors 12a-12n, 14, and 16. The output of the data synchronization module 38 is a complete set of synchronized data records 52a-52n corresponding to a particular time instant t. A subset of the synchronized camera streams 52a-52i is sent to the visual odometry module 40. The 3D camera motion between two consecutive images at two consecutive instants, It and It+1, is estimated in the visual odometry module 40 using a visual odometry algorithm which computes camera pose for each camera image. Camera pose is expressed as the six degrees of freedom associated with a camera, i.e. the three dimensions of spatial coordinates in a coordinate system expressing position (T), and the three rotational angles associated with the orientation of the camera in space (R) versus time t. Put another way, camera pose is the rotation (R) of the camera and the translation (T) of the camera from frame to frame.

Exemplary visual odometry algorithms that can be employed in the visual odometry module 40 can be found in Nister, D., Naroditsky, O., and Bergen, J., "Visual Odometry for Ground Vehicle Applications," *Journal of Field Robotics,* 23(1), (2006), which is incorporated by reference in its entirety; in commonly owned, U.S. patent application No. 11/159,968 filed Jun. 22, 2005, U.S. patent application No. 11/832,597 filed Sep. 18, 2006, and provisional patent application No. 60/837,707 filed Aug. 15, 2006 the disclosures of which are incorporated herein by reference in their entirety.

The subset of the camera streams 52a-52i typically comprises streams from two pairs of cameras, each pair functioning as a single stereo unit. In a minimal configuration, one stereo pair of cameras would suffice for input to the visual odometry module 40. Stereo input is needed for recovering scale in the visual odometry measurements. A single monocular camera datastream would suffice provided that the visual odometry module also receives an indication of scale. The scale is the actual distance traveled for a given displacement in the video stream. For example, if one monocular camera is used, its trajectory can be recovered in the visual odometry module 40 but it would not be clear whether the camera moved one meter or one kilometer. Scale can be recovered by several means, e.g., by using sensors such as wheel encoders or inertial sensors, by acquiring the motion of another known object per unit distance, which tells the visual odometry module 40 what was the displacement between two points, or by using two cameras in a stereo configuration with a known fixed separation. Thus, the input to the visual odometry module 40 in its minimal configuration can be a single monocular camera with a second set of data expressing scale, or a single pair of cameras configured as a single stereo camera. It is preferable to have more cameras than the minimal configuration in order to obtain a wider field of view. In one example, eight cameras are used which cover a field of view of about 200 degrees, and systems can be envisioned which would provide an entire 360 degree field of view. This increases the probability that reliable features can be detected and tracked as the cameras move through the environment.

The pose obtained from the visual odometry module 40 can he further combined with measurements from the IMU 16 in the pose filter 42. This is particularly useful for maintaining the camera pose estimate for places where visual odometry cannot provide a good motion estimate (e.g. due to lack of image features). By further incorporating optional data from the GPS 14, the camera trajectory can be localized on a world map. Once the 3D pose of one camera is computed, the pose of all cameras can be derived based on data from the extrinsic calibration module 44.

When determining camera geometry in the visual odometry module 40, the scene depicted in the images that are examined may not have an appropriate number of features to determine an accurate pose, e.g., when the camera is moving through a corridor or close to a wall and the wall does not have adequate texture. In such circumstances, a pose filter 42 is needed. This is also a situation where having additional data from the IMU 16 is advantageous. The IMU 16 does not rely on imaging, but measures accelerations and integrates them to produce an angular rate which bridges those gaps in the video images where there are no image features. The pose filter 42 is essentially a Kalman filter that integrates the pose measurements, the IMU measurements, and the optional GPS measurements coming at different times with different levels of uncertainty associated with each input, and tries to produce one output. Once the pose for one of the cameras, e.g., 12a, is computed in the visual odometry module 40, the pose for all of the other cameras 12b-12n ($P_x$) can be derived in the pose filter 42 based on extrinsic calibration parameters provided by block 44 to be described hereinbelow. A suitable pose filter 42 for use in the present invention is described in Z. Zhu, T. Oskiper, O. Naroditsky, S. Samarasekera, H. S. Sawhney, and R. Kumar, "Precise Visual Navigation in Unknown GPS-denied Environments Using Multi-Stereo Vision and Global Landmark Matching," in Unmanned Systems Technology IX, Proceedings of SPIE, Vol. 6561, Apr. 9-12, 2007, which is incorporated herein by reference in its entirety.

Extrinsic calibration information from an extrinsic calibration block 44 is fed to both the odometry module 40 and the pose filter 42. Camera calibration information is encapsulated in a camera's intrinsic parameter matrix K:

$$K = \begin{pmatrix} f_x & 0 & c_x \\ 0 & f_y & c_y \\ 0 & 0 & 1 \end{pmatrix}$$

where $f_x$, $f_y$ are the camera focal length in the horizontal and vertical direction (in pixels) and $c_x$, $c_y$ are the image coordinates of the camera center. The position and orientation of the cameras 12a-12n relative to each other in a local coordinate image is determined. Since, in the current example, the cameras are rigidly mounted, the position and orientation transformation from one camera coordinate image to any other camera coordinate image can be recovered and then transferred to that of any of the other cameras.

The output of the pose filter 42 are the pose $P_x$ for all of the camera 12a-12n. The MTI module 46 takes as inputs the input video sequences, $C_x$, for a camera, e.g., 12a, and the camera pose, $P_x$, and generates the list of candidate detected moving targets for that camera (DETx). From each of the input video sequences, $C_x$, two images of one camera are examined, $I_{ref}$ and $I_{insp}$. The MTI module 46 processes the two images of, for example, the camera 12a, and the camera poses for the camera 12a, using the combined output of two MTI algorithms: an epipolar constraint method and a shaped-based method, to be described in connection with FIG. 5 hereinbelow. The candidate moving targets, DETx, are further filtered in an appearance classifier module 48, which narrows the list of candidate moving targets, DETx, to a smaller list of filtered moving targets, DETx, from which false positive candidates have been eliminated. The appearance classifier 48 determines whether image areas where motion was detected in the MTI module 46 contains features that are consistent with a particular class of objects of interest (e.g., peoples, vehicles, etc.). A preferred implementation for the appearance classifier can be found in co-pending, commonly owned, provisional patent application No. 60/943,631 filed Jun. 13, 2007, which is incorporated herein by reference in its entirety.

The viewer 50 combines the output of the filtered moving targets, DET'x, and the video stream of one of the cameras 12a-12n to produce a composite video output which highlights detected moving targets within the input video stream from one of the cameras 12a-12n. For example, the input video stream can be overlaid with bounding boxes surrounding moving targets as is shown in FIG. 3. For a wider field of view, the algorithm above is repeated for each of the other cameras 12b-12n. The algorithm above can also be repeated to detect the same or more moving targets at other times using another two images.

Figure 5:
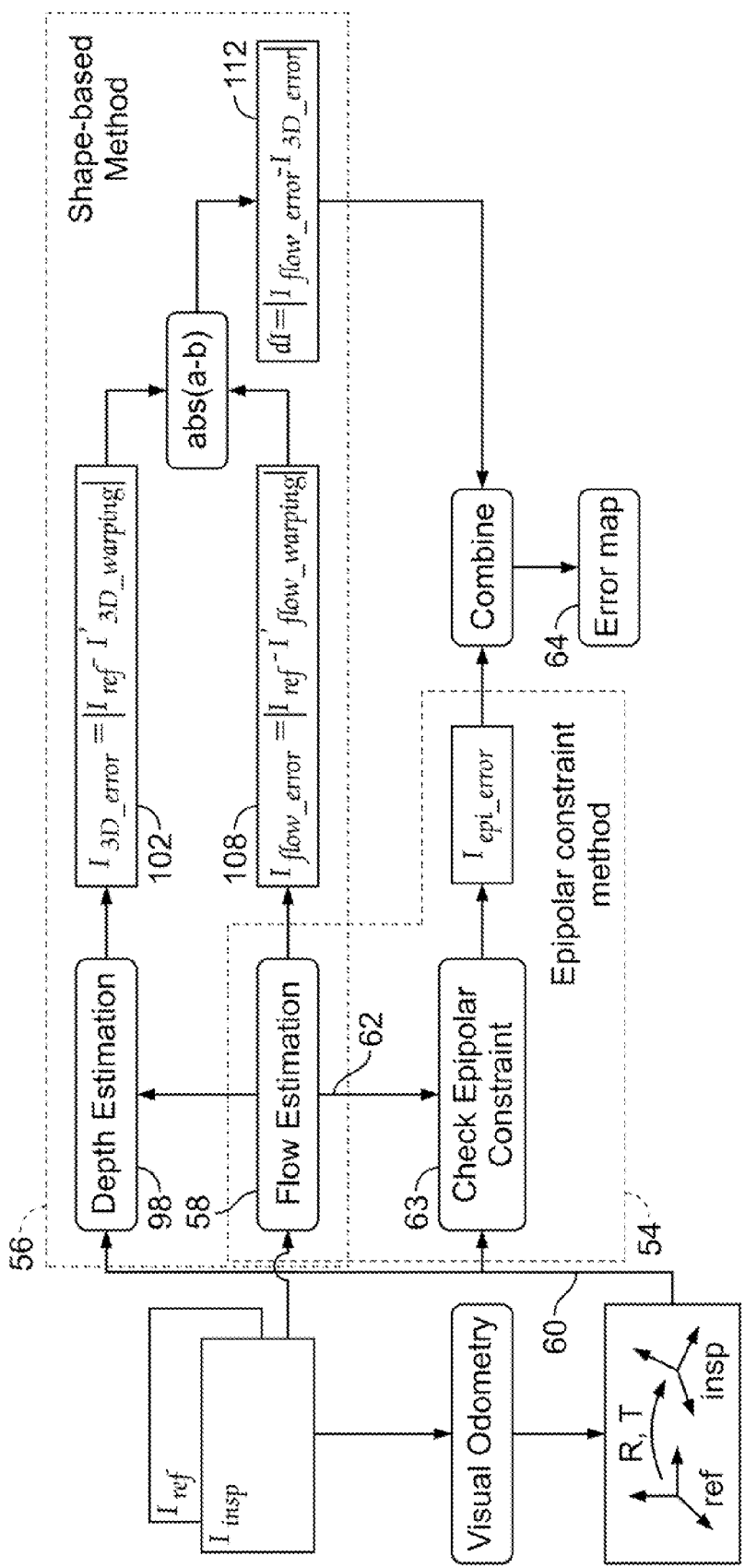
FIG. 5 is a block diagram of software architecture for implementing an epipolar constrain method and a shape-based method for implementing the moving target indication block of FIG. 4.

Referring now to FIG. 5, a block diagram of the epipolar constraint method 54 and the shaped-based method 56 are depicted. The inputs are two images, $I_{ref}$ and $I_{insp}$ corresponding to two images (not necessarily consecutive) from one camera, and the pose of that camera, represented by the 3D rotation R, and translation T, estimated from the visual odometry block 40. The input images, $I_{ref}$ and $I_{insp}$ are fed to a flow estimation block 58, which is common to both the epipolar constraint method 54 and the shaped-based method 56. The flow estimation block 58 calculates an estimate of the flow, or displacement vector at the every pixel between the two camera images $I_{ref}$ and $I_{insp}$. The pose estimate 60 and the flow estimate 62 are provided as inputs to an epipolar constraint block 63 to be described hereinbelow. The output of the epipolar constrain block 63 is $I_{epi\_error}$, which is a collection of points between the images $I_{ref}$ and $I_{insp}$ which have a flow whose orientation differs by greater than a predetermined amount from the direction of the epipole, and thus belongs to a collection of objects that are labeled as potential moving objects. $I_{epi\_error}$ is combined with the output of the shape-based method 56, labeled dI, and stored in an error map 64 as the list of all potential moving object candidates. Several methods may be used for combining the two outputs, $I_{epi\_error}$ and dI; logical AND (report only targets detected by both methods), logical OR (report targets detected by either method), or selecting one of the two inputs depending on scene content and camera motion. The epipolar constraint method 54 is well suited for scenes with significant 3D structure when the camera motion has a significant translational component. The workings of the epipolar constraint block 63 can be summarized as follows: The camera motion in 3D is recovered. Next, the image motion due to camera rotation (which is independent of the 3D structure in front of the camera) is eliminated. Then the residual optical flow is computed. For most points in the compared images, this flow will be epipolar, i.e., all flow vectors corresponding to the static background intersect at a common point (the epipole). The points in the image where the flow vectors do not satisfy this constraint are labeled as independently moving.

Figure 6:
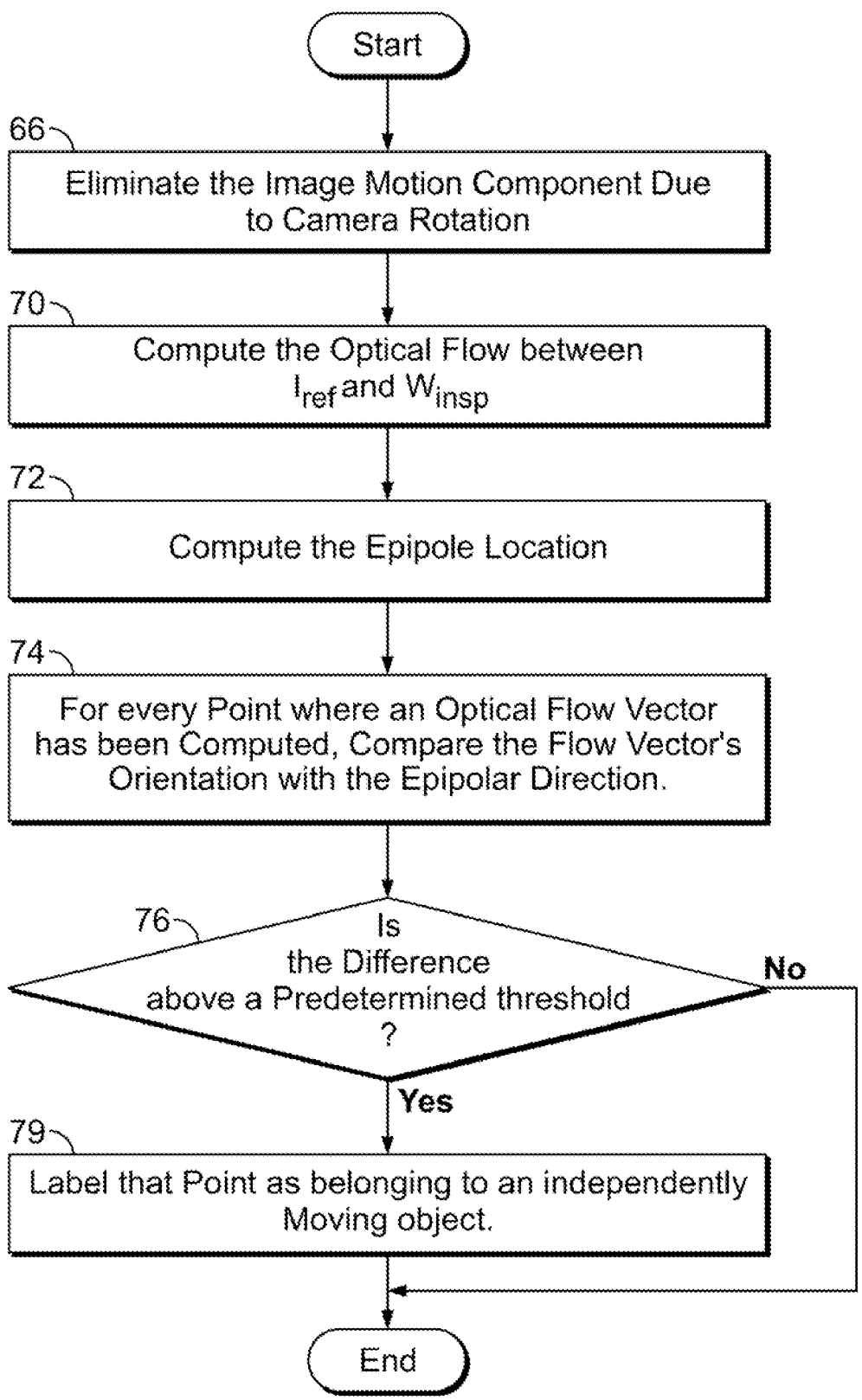
FIG. 6 is a flow chart illustrating the steps taken in performing the epipolar constraint method of FIG. 5.

Referring now to FIG. 6, is a flow chart illustrating the steps taken in the epipolar constraint method 54 is depicted. At stop 66, the image motion component due to camera rotation is eliminated. This motion is independent of the 3D structure of the scene, and can be computed as a global parametric transformation $M=KRK^{-1}$, where K is the camera matrix discussed previously for camera calibration and R is the 3D rotation computed from the visual odometry module 40. M is used to warp $I_{insp}$ into $W_{insp}$, the image $I_{insp}$ compensated for camera rotation (As used herein warping is the process of digitally manipulating an image by moving (or remapping) image pixels according to a transformation). At step 70, the optical flow between $I_{ref}$ and $I_{insp}$ is computed. Since the effects of camera rotation have been eliminated, this flow will be epipolar, i.e. all flow vectors corresponding to the static background will intersect at a common point (the epipole). A representative approach to computing optical flow is described in J. R. Bergen, P. Anandan, K. J. Hanna, and R. Hingorani, "Hierarchical model-based motion estimation," in European Conference on Computer Vision, pp. 237-252, (Santa Margharita Ligure, Italy), 1992, which is incorporated herein by reference in its entirety. At step 72, the epipole location is computed. The epipole location is derived from the translation component of the 3D camera motion and camera matrix: e=KT. At step 74, for every point where an optical flow vector has been computed, the flow vector's orientation is compared with the epipolar direction. At step 76, if the difference is above a predetermined threshold, then at step 79, that point is labeled as belonging to an independently moving object, otherwise its is not.

Figure 7:
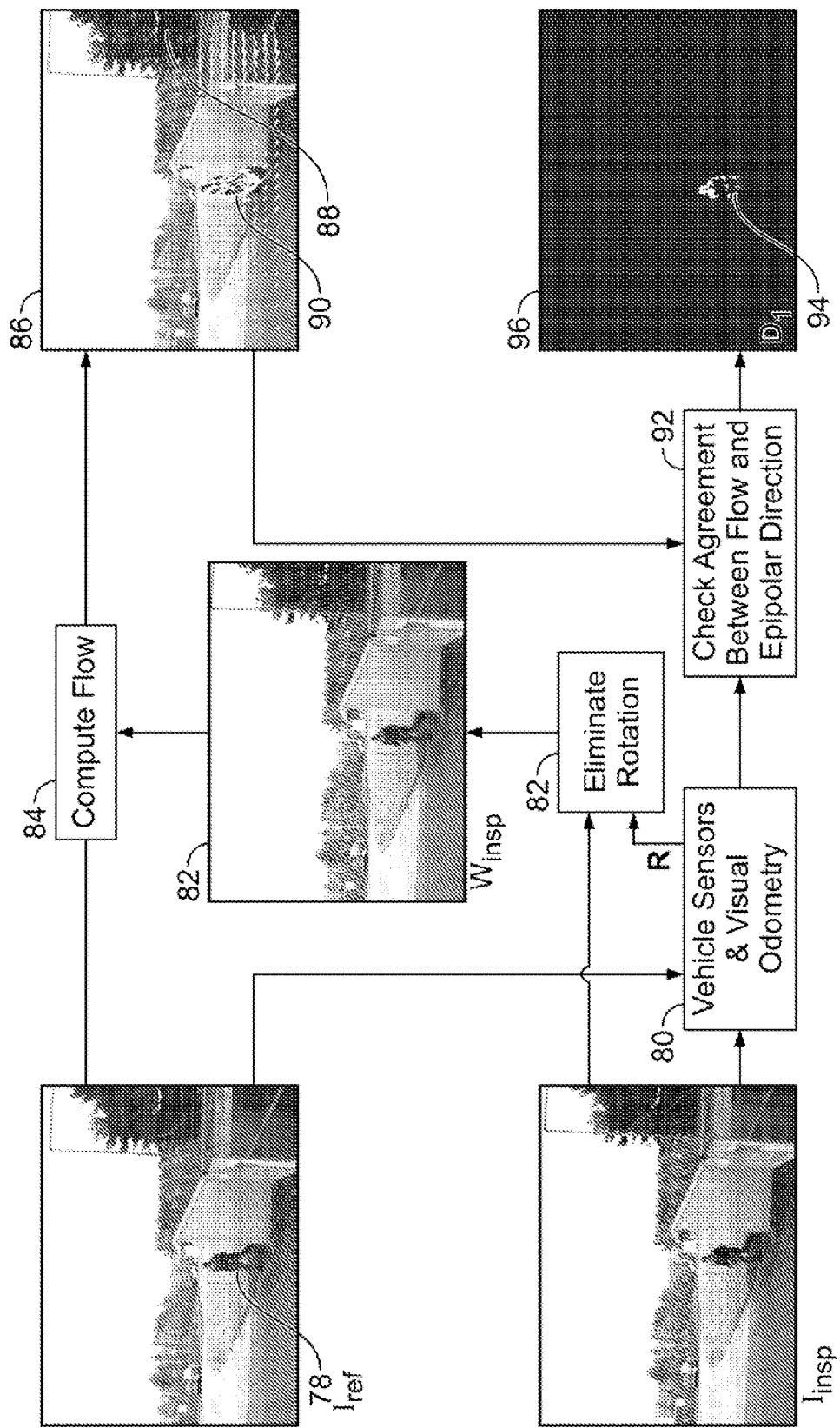
FIG. 7 are a set of video images that illustrate results of the steps taken in the epipolar constraint method of FIG. 6.

Referring now to FIG. 7, the algorithm steps of FIG. 6 are illustrated pictorially. On the left are images, labeled $I_{ref}$ and $I_{insp}$ from a camera pointing approximately 20 degrees to the right of a vehicle's longitudinal axis (see FIG. 1). The vehicle (not shown) is moving forward and the scene is static, except for one person 78 moving in the foreground. R (rotation) and T (translation) are obtained from visual odometry calculations in box 80. The 3D camera rotation from the second image, $I_{insp}$ is eliminated (compensated) in box 82 relative to the image taken at image $I_{ref}$ to produce a warped image 82 designated $W_{ref}$. This is possible because for the pure rotation the image transformation does not depend on the 3D structure of the scene. Once the warped image 82 is obtained, the optical flow between the reference image $I_{ref}$ and the warped inspection image $W_{insp}$ is computed in box 84 to produce the image 86 with flow vectors 88, 90 superimposed. The image 86 is fed into box 92, in which the epipole and epipolar direction are computed and compared to the flow vectors 88, 90. The flow vectors 88 agree with the epipolar direction, while the flow vectors 90 do not. Those flow vectors 90 which do not agree with the epipolar direction are shown as the region 94 in image 96, and are assumed to correspond to independently moving objects. The instantaneous error map $I_{epi\_error}$ is generated based on the magnitude of the angular difference between the predicted (epipolar) and actual direction of the flow vectors 88, 90.

The threshold for deciding whether flow vectors correspond to moving targets is determined by the uncertainty in the orientation of the recovered flow field. A small value (close to zero) for the threshold would generate a large number of false positive detections since the recovered orientation of the flow vectors corresponding to the static background may not exactly match the epipolar direction. A large value for the threshold (e.g. 90 degrees) would eliminate these false detections but also miss many independently moving objects. In practice a threshold value of 15-20 degrees provides a good compromise between detection and false alarm rates.

Figure 8:
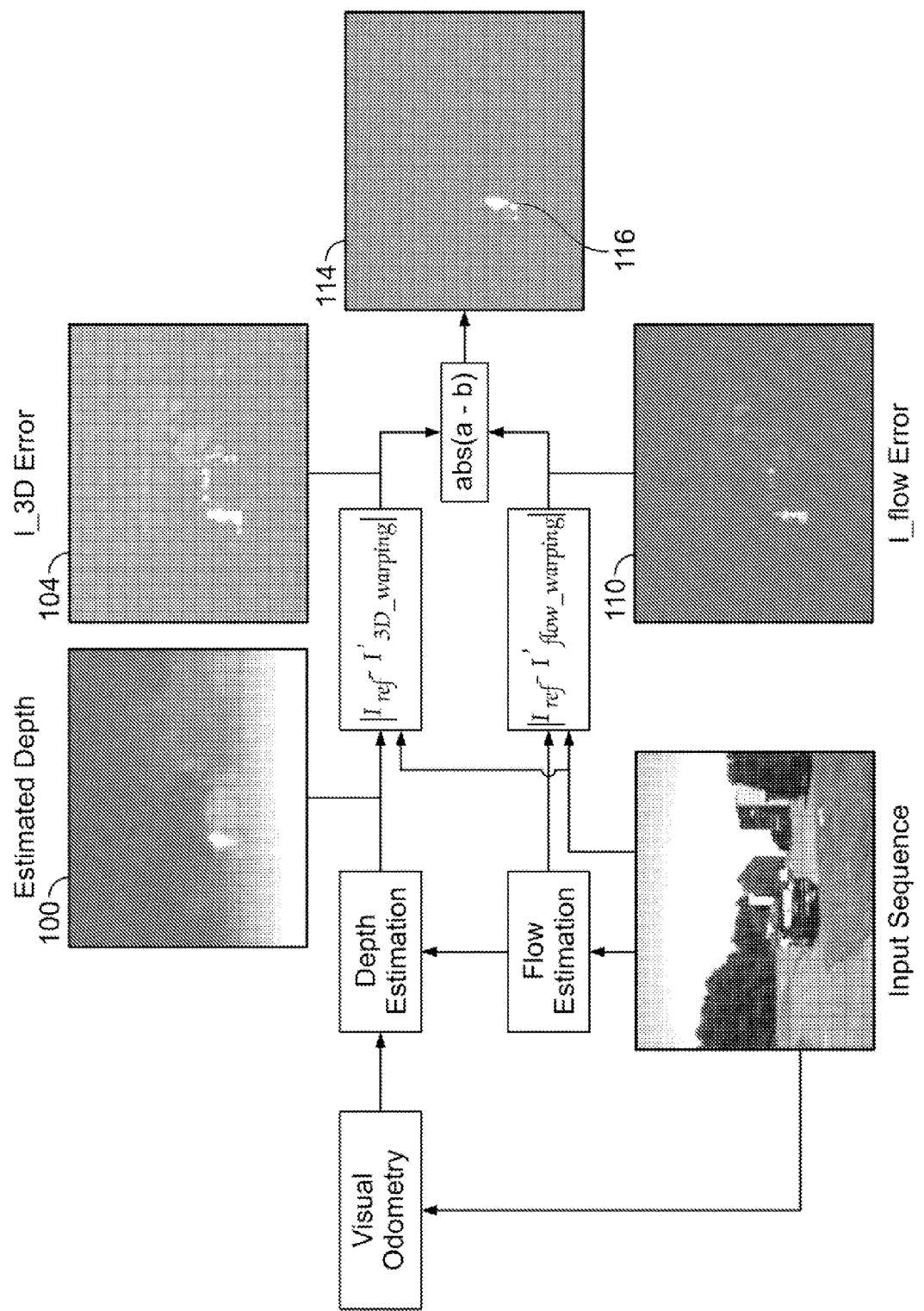
FIG. 8 are a set of video images that illustrate results of the steps taken in the shape-based method of FIG. 6.

Referring now to FIGS. 5 and 8, the shaped-based method 56 is depicted algorithmically (FIG. 5) and visually (FIG. 8). For the shape-based method 56, the depth of objects in an image is estimated (depth estimation block 98 in FIG. 5 and estimated depth image 100 in FIG. 8). Given an optical flow vector [u,v] of image pixel $p(x_1,y_1)$ at $I_{ref}$, the corresponding pixel position in image $I_{insp}$ is $(x_2=x_1+u, y_2=y_1+v)$. Then the 3D position (X, Y, Z) of this pixel can be estimated by computing the intersection of two ray back-projections of $(x_1,y_1)$ and $(x_2,y_2)$ as follows:

$$x_1 = \frac{K_1^{11}X + K_1^{12}Y + K_1^{13}Z + K_1^{14}}{K_1^{31}X + K_1^{32}Y + K_1^{33}Z + K_1^{34}}$$

$$y_1 = \frac{K_1^{21}X + K_1^{22}Y + K_1^{23}Z + K_1^{24}}{K_1^{31}X + K_1^{32}Y + K_1^{33}Z + K_1^{34}}$$

$$x_2 = \frac{K_2^{11}X + K_2^{12}Y + K_2^{13}Z + K_2^{14}}{K_2^{31}X + K_2^{32}Y + K_2^{33}Z + K_2^{34}}$$

$$y_2 = \frac{K_2^{21}X + K_2^{22}Y + K_2^{23}Z + K_2^{24}}{K_2^{31}X + K_2^{32}Y + K_2^{33}Z + K_2^{34}}$$

where $K_1$ and $K_2$ are camera matrices of images $I_{ref}$ and $I_{insp}$ respectively, and $K_1^{ij}$ is the element of matrix $K_1$. Given the above four equations, the 3D position (X, Y, Z) of pixel p is over-determined and can be solved by the least squared method, as is known in the art.

Once the depth for each pixel is estimated, the second image $I_{insp}$ can be warped into the reference view of $I_{ref}$ using back-projection to get the warped image $I'_{3D\_warping}$. After subtracting images $I_{ref}$ and $I'_{3D\_warping}$, the depth warping residual image error $I'_{3D\_error}$ is obtained (box 102 in FIG. 5, and image 104 in FIG. 8). From the image 104 shown in FIG. 8, the residual image error $I'_{3D\_error}$ can be quite large for an independently moving object since it does not strictly follow 3D geometric constraint. For stationary 3D structures, the residual image error $I'_{3D\_error}$ is generally small. However, in reality, there are a number of pixels in image $I_{ref}$ without corresponding pixels in $I_{insp}$ due to occlusion (the manner in which an object closer to a camera masks (or occludes) an object further away from the camera) induced by parallax.

In order to suppress such estimation errors due to the parallax effect, a flow-based filter is designed to cancel the occlusion regions from $I'_{3D\_error}$. Using the same flow estimate 62 described earlier for the epipolar constraint method 54, $I'_{flow\_warping}$ is calculated (in the case of flow warping, the displacement of each pixel is specified by the flow field vector at that image location) and subtracted from $I_{ref}$ to produce $I_{flow\_error}$ in box 108 of FIG. 5 and displayed in image 110 of FIG. 8. Since the optical flow approach attempts to minimize image residue $I_{flow\_error}$ between two input images, the image residue for independently moving object will be also reduced by the minimization process and generally is smaller than those in $I'_{3D\_error}$. For those occlusion regions, the image residue $I_{flow\_error}$, is similar to $I'_{3D\_error}$, since in both cases there are no exact correspondences to minimize the image residues. From the two image residues, $I'_{3D\_error}$ and $I_{flow\_error}$, a second order residual difference, dI, is generated in the residual difference map 112 of FIG. 5 and image 114 of FIG. 8. In the residual difference map 112 (image 114), the independently moving object 116 generates a strong response, and image residues at the parallax regions will be cancelled. This approach can also effectively cancel the illumination inconsistency due to camera motion since both residual images 104, 110 have the same response for illumination variations. After applying the shaped-based method 56, the image residues due to occlusion regions are filtered out and only the independently moving object 116 has a strong response.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for detecting a moving target, comprising the steps of:
    receiving a plurality of images from at least one camera;
    receiving a measurement of scale from one of a measurement device and a second camera;
    calculating a pose of the at least one camera over time based on the plurality of images and the measurement of scale;
    selecting a reference image and an inspection image from the plurality of images of the at least one camera;
    determining an epipole direction from the inspection image, the reference image, and the calculated pose;
    comparing a flow vector of a pixel in the inspection image with the direction of the epipole; and
    labeling the pixel as belonging to an independently moving object when the difference in direction between the flow vector and the direction of the epipole is above a predetermined threshold;
    detecting a moving target from the reference image and the inspection image based on an orientation of corresponding portions in the reference image and the inspection image relative to a location of an epipolar direction common to the reference image and the inspection image; and
    displaying any detected moving target on a display.

2. The method of claim 1, wherein the step of detecting a moving target further includes the step of producing an image based on changes in depth between the inspection image and the reference image and based on changes in flow between the inspection image and the reference image.

3. The method of claim 2, further comprising the step of confirming the presence of the moving target by applying an appearance classifier to a portion of the reference image containing a candidate moving target.

4. The method of claim 3, further comprising the step of applying a pose filter to a pose determined by said step of calculating the pose.

5. The method of claim 4, wherein the pose is determined by visual odometry.

6. The method of claim 5, further comprising the step of receiving a data stream from an IMU.

7. The method of claim 6, further comprising the step synchronizing the data stream from the IMU with the plurality of images.

8. The method of claim 7, further comprising the step of superimposing a viewer on the reference image so as to highlight any detected moving targets.

9. The method of claim 5, further comprising the step of receiving a data stream from a GPS receiver.

10. The method of claim 2, wherein said step of producing an image based on changes in depth between the inspection image and the reference image and based on changes in flow between the inspection image and the reference image further comprises the steps of:
    determining the depth of each pixel in the reference image and the inspection image;
    warping the inspection image into the reference view of the reference image to produce a three-dimensional (3D) warped image;
    producing a 3D error image that is the difference between the 3D warped image and the reference image;
    computing an optical flow between the reference image and the inspection image to produce a flow warping image;
    producing a flow error image that is the difference between the flow warping image and the reference image; and
    producing a second order residual difference image by subtracting the flow error image from the 3D error image; and
    labeling any illuminated pixels in the second order residual difference image as belonging to an independently moving object.

11. The method of claim 1, wherein the measurement of scale is derived from the second camera.

12. The method of claim 1, wherein the measurement of scale is derived from a wheel odometer.

13. The method of claim 1, wherein said step of detecting a candidate moving target based on the orientation of corresponding portions in the reference image and the inspection image relative to a location of an epipolar direction further comprises the steps of:
    eliminating an image motion component of the inspection image due to camera rotation;
    computing an optical flow between the reference image and the inspection image that was compensated for camera rotation; and
    labeling the pixel as belonging to fixed object when the difference in direction between the flow vector and the direction of the epipole is equal to or below the predetermined threshold.

14. An apparatus for detecting a moving target, comprising:
    at least one camera for receiving a plurality of images;
    at least one of a measurement device and a second camera for receiving a measurement of scale;
    a processor communicatively connected to said at least one camera and said at least one of a measurement device and a second camera for:
        receiving a measurement of scale for calculating a pose of the at least one camera based on the plurality of images;
        for selecting a reference image and an inspection image from the plurality of images of the at least one camera;
        for detecting a moving target from the reference image and the inspection image based on an orientation of corresponding portions in the reference image and the inspection image relative to a location of an epipolar direction common to the reference image and the inspection image;
        for determining an epipole direction from the inspection image, the reference image, and the calculated pose;

comparing a flow vector of a pixel in the inspection image with a direction of the epipole;

labeling the pixel as belonging to an independently moving object when the difference in direction between the flow vector and the direction of the epipole is above a predetermined threshold; and a viewer for displaying any detected moving target.

15. The apparatus of claim 14, wherein said processor further detect a moving target by producing an image based on changes in depth between the inspection image and the reference image and based on changes in flow between the inspection image and the reference image.

16. The apparatus of claim of claim 15, wherein said processor confirms the presence of the moving target by applying an appearance classifier to a portion of the reference image containing a candidate moving target.

17. The apparatus of claim 16, wherein said processor further applies a pose filter to a pose.

18. The apparatus of claim 17, wherein the pose is determined by visual odometry.

19. The apparatus of claim 18, further comprising a GPS receiver for sending a measurement of position to said processor.

20. The apparatus of claim 17, further comprising an IMU for sending measurements of orientation to said processor.

21. The apparatus of claim 14, wherein the measurement of scale is derived from the second camera.

22. The apparatus of claim 14, wherein the measurement of scale is derived from a wheel odometer.

23. A non-transitory computer-readable medium carrying one or more sequences for detecting a moving target, wherein execution of the one or more sequences of instructions by one or more processors causes the one or more processors to perform the steps of:

receiving a plurality of images from at least one camera;

receiving a measurement of scale from one of a measuring device and a second camera;

calculating a pose of the at least one camera based on the plurality of images and the measurement of scale;

selecting a reference image and an inspection image from the plurality of images of the at least one camera;

determining an epipole direction from the inspection image, the reference image, and the calculated pose;

comparing a flow vector of a pixel in the inspection image with a direction of the epipole;

labeling the pixel as belonging to an independently moving object when the difference in direction between the flow vector and the direction of the epipole is above a predetermined threshold;

detecting a moving target from the reference image and the inspection image based on an orientation of corresponding portions in the reference image and the inspection image relative to a location of an epipolar direction common to the reference image and the inspection image; and displaying any detected moving target on a display.

24. The computer-readable medium of claim 23, wherein the step of detecting a moving target further includes the step of producing an image based on changes in depth between the inspection image and the reference image and based on changes in flow between the inspection image and the reference image.

25. The computer-readable medium of claim 24, wherein the measurement of scale is derived from the second camera.

26. The computer-readable medium of claim 24, wherein the measurement of scale is derived from a wheel odometer.

27. The computer-readable medium of claim 24, further comprising the step of confirming the presence of the moving target by applying an appearance classifier to a portion of the reference image containing a candidate moving target.

28. The computer-readable medium of claim 24, wherein said step of detecting a candidate moving target based on the orientation of corresponding portions in the reference image and the inspection image relative to a location of an epipolar direction further comprises the steps of:

eliminating an image motion component of the inspection image due to camera rotation;

computing an optical flow between the reference image and the inspection image that was compensated for camera rotation; and labeling the pixel as belonging to fixed object when the difference in direction between the flow vector and the direction of the epipole is equal to or below the predetermined threshold.

29. The computer-readable medium of claim 24, wherein said step of producing an image based on changes in depth between the inspection image and the reference image and based on changes in flow between the inspection image and the reference image further comprises the steps of:

determining the depth of each pixel in the reference image and the inspection image;

warping the inspection image into the reference view of the reference image to produce a three-dimensional (3D) warped image;

producing a three-dimensional (3D) error image that is the difference between the 3D warped image and the reference image;

computing an optical flow between the reference image and the inspection image to produce a flow warping image;

producing a flow error image that is the difference between the flow warping image and the reference image; and producing a second order residual difference image by subtracting the flow error image from the 3D error image; and labeling any illuminated pixels in the second order residual difference image as belonging to an independently moving object.

* * * * *